Jan. 15, 1924.

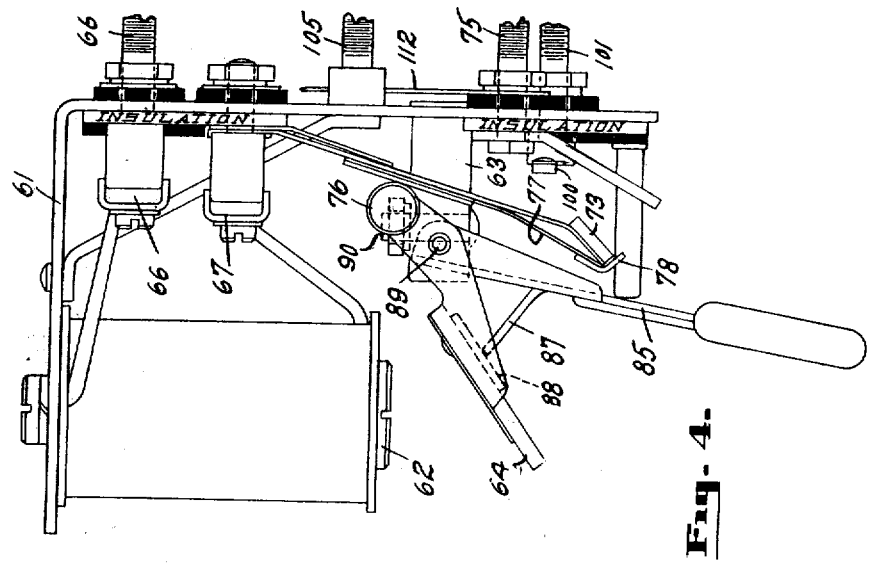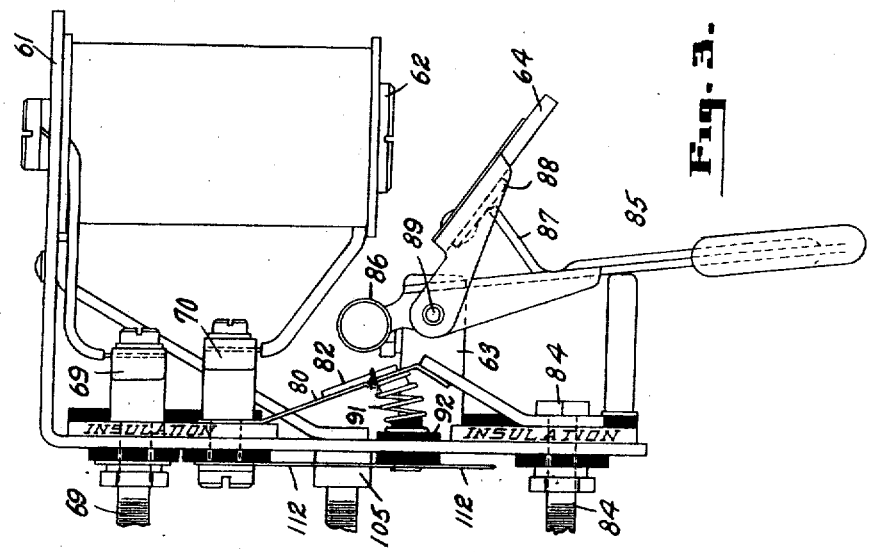

L. S. KEILHOLTZ 1,480,618

CONTROLLER FOR ELECTRICAL SYSTEMS

Filed May 26, 1919   4 Sheets-Sheet 4

Patented Jan. 15, 1924.

1,480,618

UNITED STATES PATENT OFFICE.

LESTER S. KEILHOLTZ, OF DAYTON, OHIO, ASSIGNOR, BY MESNE ASSIGNMENTS, TO DELCO-LIGHT COMPANY, OF DAYTON, OHIO, A CORPORATION OF DELAWARE.

CONTROLLER FOR ELECTRICAL SYSTEMS.

Application filed May 26, 1919. Serial No. 299,876.

*To all whom it may concern:*

Be it known that I, LESTER S. KEILHOLTZ, a citizen of the United States of America, residing at Dayton, county of Montgomery, State of Ohio, have invented certain new and useful Improvements in Controllers for Electrical Systems, of which the following is a full, clear, and exact description.

This invention relates to electrical systems including a storage battery, a dynamo driven by an internal-combustion engine for charging the battery or operable as a motor to start the engine, and ignition apparatus for the engine.

One of the objects of the invention is to control the system during the starting operation in such a manner that sufficient current will be delivered to the ignition apparatus to furnish suitable ignition for starting, while the battery is also supplying current to the dynamo.

Other and further objects and advantages of the present invention will be apparent from the following description, reference being had to the accompanying drawings, wherein preferred forms of one embodiment are clearly shown.

In the drawings:—

Fig. 3 is a left-side elevation of said device looking toward the right;

Fig. 4 is a right-side elevation of said device looking toward the left; and

Figure 1:
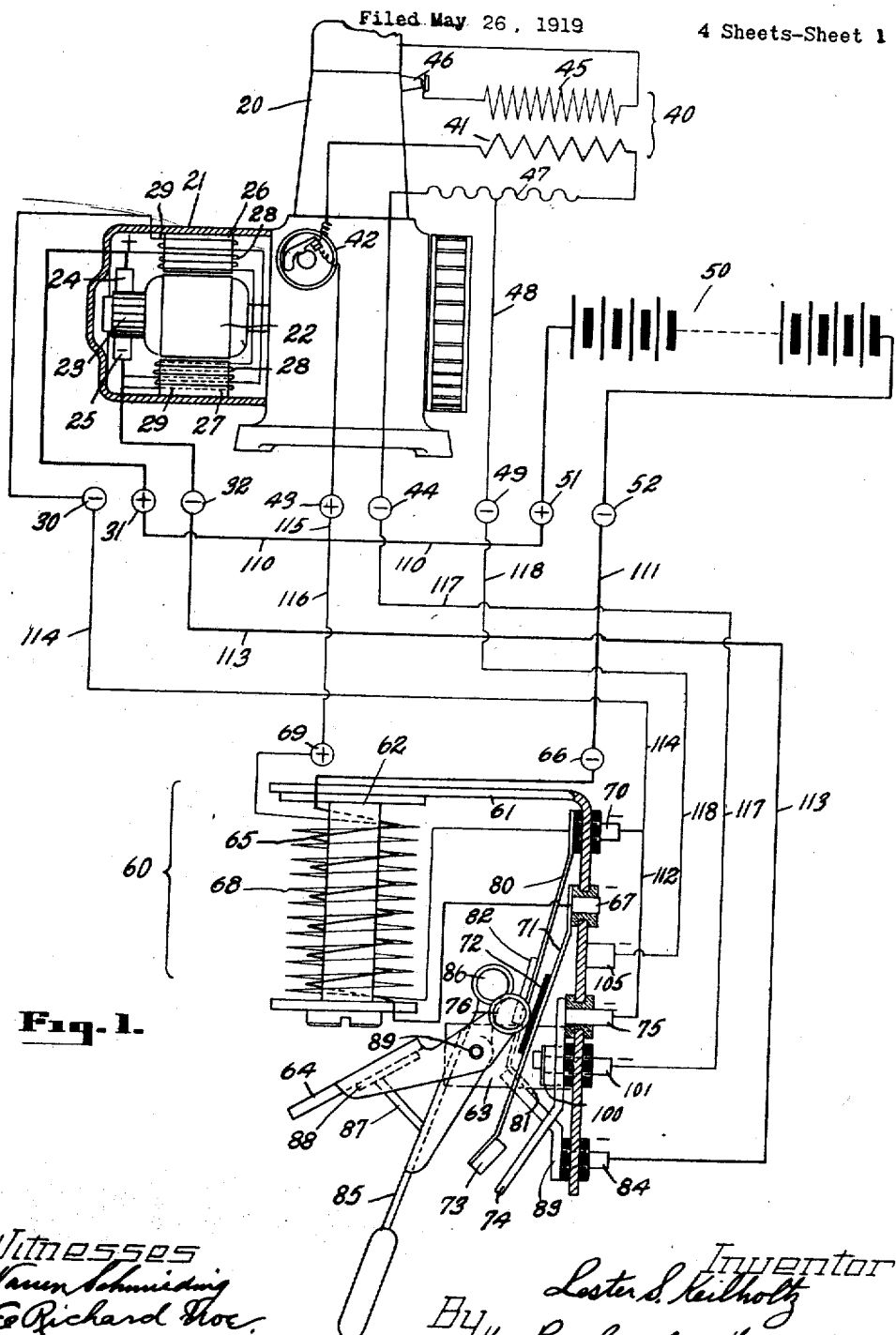
Fig. 1 is a diagrammatic side elevation of an internal-combustion engine directly connected with a dynamo which is partly shown in section, together with a wiring diagram including a diagrammatic side elevation of the controlling device included in the present invention.
Figure 2:
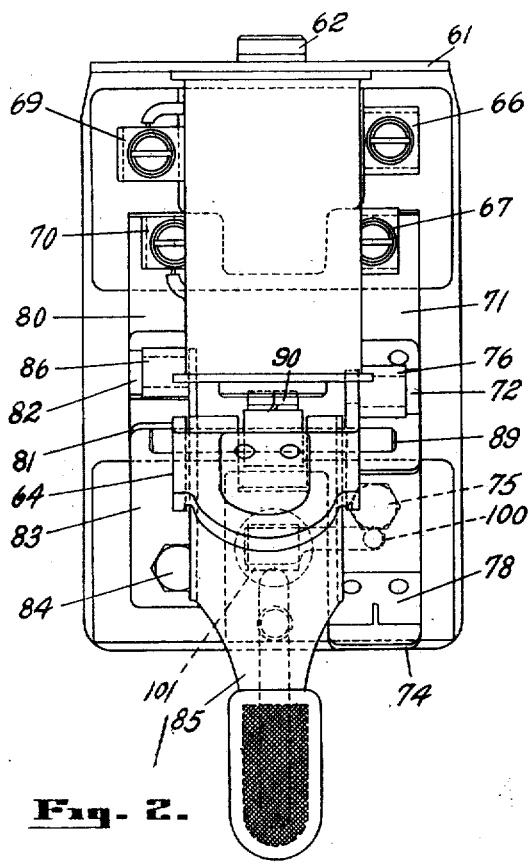
Fig. 2 is a front elevation of said controlling device.

In the drawings, 20 designates an internal-combustion engine driving a dynamo 21 which is directly connected with the engine. Dynamo 21 includes an armature 22, commutator 23, brushes 24 and 25, and field pole pieces 26 and 27. The dynamo is provided with a shunt field 28 connected across the brushes 24 and 25, and with a series field 29, one end of which is connected with brush 25, and the other with dynamo terminal 30. Brush 24 is connected with terminal 31, and brush 25 with terminal 32.

Ignition for the engine is furnished by the agency of the ignition coil 40 which includes primary 41 connected with timer 42, which in turn is connected with ignition terminal 43. The other end of primary 41 is connected with ignition resistance 47 which in turn is connected with ignition terminal 44. A portion of resistance 47 is short-circuited by a wire 48 leading into terminal 49. Secondary winding 45 is connected at one end with spark plug 46 and grounded at the other end upon the engine. 50 designates a storage battery, the positive side of which is connected with terminal 51 and the negative side with terminal 52.

The controller 60 will now be described. This controller includes a frame 61 of magnetic material supporting a magnet core 62 and an armature post 63. Post 63 supports a pivotally mounted armature 64. A magnetic circuit is formed by members 62, 61, 63 and 64, with a gap between the armature 64 and the core 62. Upon the core 62 is mounted a series magnet winding 65, one end being connected with terminal 66 and the other with terminal 67. The core 62 also supports a shunt magnet winding 68, one end being connected with a terminal 69 and the other end connected with terminal 70.

Terminal 67 is connected with a resilient conductor 71 carrying a non-conducting rubbing-block 72 and a contact 73. Contact 73 is arranged to engage with contact 74 which is connected with terminal 75. A roller 76, pivotally mounted upon the armature 64, engages the rubbing-block 72 when the armature 64 is moved upwardly, in order to move contact 73 into engagement with contact 74. Preferably the conductor 71 carries a resilient conductor 77, carrying at its outer end a contact of arc-withstanding material 78 projecting beyond the outer surface of contact 73, as is shown in Fig. 4.

Contact 70 is connected with resilient conducting member 80 having its outer end bent over to form a contact 81 and carrying intermediate its ends a conducting rubbing-block 82. Contact 81 is arranged to engage with contact 83 which is connected with terminal 84. A controlling lever 85, pivotally mounted upon the armature post 63, carries a roller 86 which is arranged to engage with the rubbing-block 82 to make electrical contact therewith for a purpose to be described later, and to move the contact 81 out of engagement with the contact 83.

Lever 85 is provided with a projecting tongue 87 which is arranged to engage the under side of a block 88 of non-magnetic material which is mounted upon the under side of armature 64. The purpose of this block 88 is to prevent a magnetic circuit being directly formed between armature 64 and lever 85, where these members are made of magnetic material, such as pressed steel. The lever 85 and the armature 64 are preferably mounted upon rod 89, which is supported by armature post 63 and held in position by means of the bolt 90.

A resilient conductor 100, carried by terminal 101, is provided with a portion which extends within the path of motion of the conductor 71, so as to be engaged thereby when contacts 73 and 74 are closed. The terminals 66, 67, 69, 70, 75, 84 and 101, which have been described, are all mounted upon the frame 61 but are insulated therefrom. The frame carries one contact 105 which is grounded thereon. All of these terminals but terminal 66 are connected to the same side of the battery in order to reduce the possibility of short-circuit of the dynamo or battery through the controller 60.

To assist the resilient conductor 80 to maintain the contact 81 normally in engagement with the contact 83, a spring 91 is interposed between a non-conducting stud 92 supported by the frame 61 and the under surface of said conductor 80.

The connections between the dynamo, battery, ignition apparatus, and the controller are as follows: Dynamo terminal 31 is connected with battery terminal 51 by a wire 110. Battery terminal 52 is connected with controller terminal 66 by wire 111. Controller terminals 70 and 75 are connected by bus-bar 112. Controller terminal 84 is connected with generator terminal 32 by a wire 113. Controller terminal 70 is connected with generator terminal 30 by a wire 114. Wire 110 is connected by wire 115 with ignition terminal 43, and by wire 116 with controller terminal 69. Ignition terminal 44 is connected by wire 117 with terminal 101. The ignition terminal 49 is connected with terminal 105 by a wire 118.

The operation of the invention is as follows: To start the engine the lever 85 is pulled up,—that is rotated clockwise, causing the roller 86 to move into engagement with the rubbing-block 82 and make electrical contact therewith, and to separate contacts 81 and 83. This movement of lever 85 imparts clock-wise rotation to armature 64 through the tongue 87, causing roller 76 to press against the rubbing-block 72 and to move contact 73 into engagement with contact 74 and the conductor 71 into engagement with the conductor 100.

The following cranking circuit will then be established: from the positive terminal 51 of battery 50, through wire 110, generator terminal 31, brush 24, armature 22, brush 25, series winding 29, terminal 30, wire 114, terminal 70, bus-bar 112, terminal 75, contact 74, contact 73, conductor 71, terminal 67, series winding 65, terminal 66, and wire 111 to battery terminal 52. It will be noted that since contacts 81 and 83 are separated that current cannot flow out of generator terminal 32 through the conductor 113, and thence through terminal 84, contacts 83 and 81, and thence from terminal 70 to the battery terminal 52 through the circuit described. In this manner the short circuit around the series winding is interrupted so that the dynamo will act as a compound-wound motor, the shunt winding 28 being at all times connected across the brushes 24 and 25.

When the starting lever 85 is still in the position described, the following ignition circuit will be established: from battery terminal 51, through wire 110, wire 115, ignition terminal 43, timer 42, primary 41, resistance 47, a part of which is short-circuited by wire 48 leading to terminal 49. From terminal 49 the greater part of the current passing through coil 41 will pass through wire 118 to the grounded terminal 105. From terminal 105 the circuit continues through the frame 61, armature post 63, lever 85, roller 86, rubbing-block 82, conductor 80, terminal 70, bus-bar 112, terminal 75, contact 74, contact 73, conductor 71, terminal 67, series winding 65, terminal 66, wire 111 to the negative battery terminal 52. During the starting operation the dynamo, when acting as a motor, consumes considerable current from the battery, causing a considerable drop in potential across the battery terminals, and unless some means is provided for decreasing the resistance of the ignition circuit under these conditions, the ignition apparatus will not receive its full share of current for ignition purposes. In the present invention this difficulty is overcome by short-circuiting a portion of the ignition resistance in the manner described, so that notwithstanding the drop in potential across the battery terminals sufficient current will be delivered during the starting operation to the ignition apparatus, so that adequate ignition will be furnished.

After the engine has become self-operative it will quickly pick up in speed and will operate the dynamo as a generator to furnish current for battery charging purposes. In order to maintain the circuit connections between the dynamo and battery in order that current may be delivered to the battery from the dynamo, series magnet winding 65 and shunt magnet winding 68 are utilized. The one winding being a voltage winding and the other a current winding, the armature 64 is maintained in attracted position with respect to magnet core 62 as long as the output of the dynamo exceeds a predetermined value.

With the armature 64 maintained magnetically in circuit closing position, the starting lever 85 may be released, that is, brought into "running position," causing the contacts 81 and 83 to be brought together to short-circuit the series-field winding 29. The dynamo will then act as a shunt-wound generator to charge the battery. Upon release of the lever 85 and its return to normal position shown in Fig. 1, the roller 86 will move out of engagement with the rubbing-block 82 and will thereby break the short circuit around the portion of the ignition resistance. During the generating operation the ignition circuit is as follows: from battery terminal 51, through wires 110 and 115 to ignition terminal 43, then through timer 42, primary 41, ignition resistance 47, terminal 44, wire 117, terminal 101, contact 100, conductor 71, terminal 67, series winding 65, terminal 66, wire 111 and to the battery terminal 52. The battery E. M. F. available for supplying current for operating the dynamo for starting and for supplying ignition current while starting the engine is obviously less than the E. M. F. of the dynamo when operating as a generator. Therefore it is necessary that the resistance in the primary ignition circuit be relatively small during engine starting and relatively greater during battery charging in order that no more current will be delivered to the ignition circuit than is necessary. This increase of resistance is effected automatically through the agency of the controller device which has been described. In case the voltage across the battery terminals is greater than that required for ignition purposes, instead of the ignition terminal 43 being connected with the end battery cell, it may be connected with a positive terminal of one of the batteries intermediate the end cells of the battery, depending on the voltage required for ignition purposes.

In case the speed of the engine falls off to such a low value that the output of the generator falls below a value sufficient to oppose the battery, the current from the battery will tend to flow toward the generator to drive the same as a motor. When this occurs there will be a reversal of current in the series magnet winding 65 which will tend to create magnetism in opposition to that created by the voltage winding 68. When this occurs the attractive force upon the armature 64 will not be sufficient to maintain it in circuit closing position against the forces exerted by the resilient conducting member 71 upon the roller 76. It will be noted that the relation of the armature 64 and roller 76 to the rubbing-block 72 is such that if there is any tendency for the magnet to release its magnetic grip upon its armature 64, this tendency will give the spring conducting member 71 an opportunity to increase the gap between armature 64 and the core 62. Any increase in the gap will make it the more difficult for the magnet to maintain the armature 64 in attracted position. At the same time, as the gap increases, the leverage of the spring force of member 71 upon the roller 76, or the moment of this force about the fulcrum pin 89, will also increase. Although the spring force in resilient member 71 is decreasing all the time that roller 76 is moving upwardly, the relation between roller 76 and block 72 is such that during the upward movement of roller 76 the lever arm of the spring force exerted by member 71 increases at a more rapid rate than the decrease of the spring force. Therefore if there is any tendency for the magnet to release its grip upon the armature and to decrease the spring pressure between contacts 73 and 74 to any substantial degree by any slight upward movement of the roller 76, this tendency will be assisted in increasing amounts as the gap between the armature and the magnet core increases. Therefore, if the spring tension in member 71 is released by the magnet to any substantial degree, the armature 64 will be almost instantly moved out of attracted position under the action of the spring pressure in member 71, and the contacts 73 and 74 which carry all of the charging current will be almost instantly separated. Therefore it is apparent that these contacts 73 and 74 will either be held together with sufficient pressure to insure a good contact or else they will be separated with sufficient rapidity to prevent arcing. This feature of the invention has been described and claimed in my co-pending application, Serial No. 310,109, filed July 11, 1919.

Arcing at the main contacts 73 and 74 is also prevented by virtue of the non-arcing, or arc-withstanding, contact 78, which engages contact 74 before contact 73 engages said contact 74, and remains in engagement with contact 74 for an instant after the separation of contact 73 from contact 74.

Figure 5:
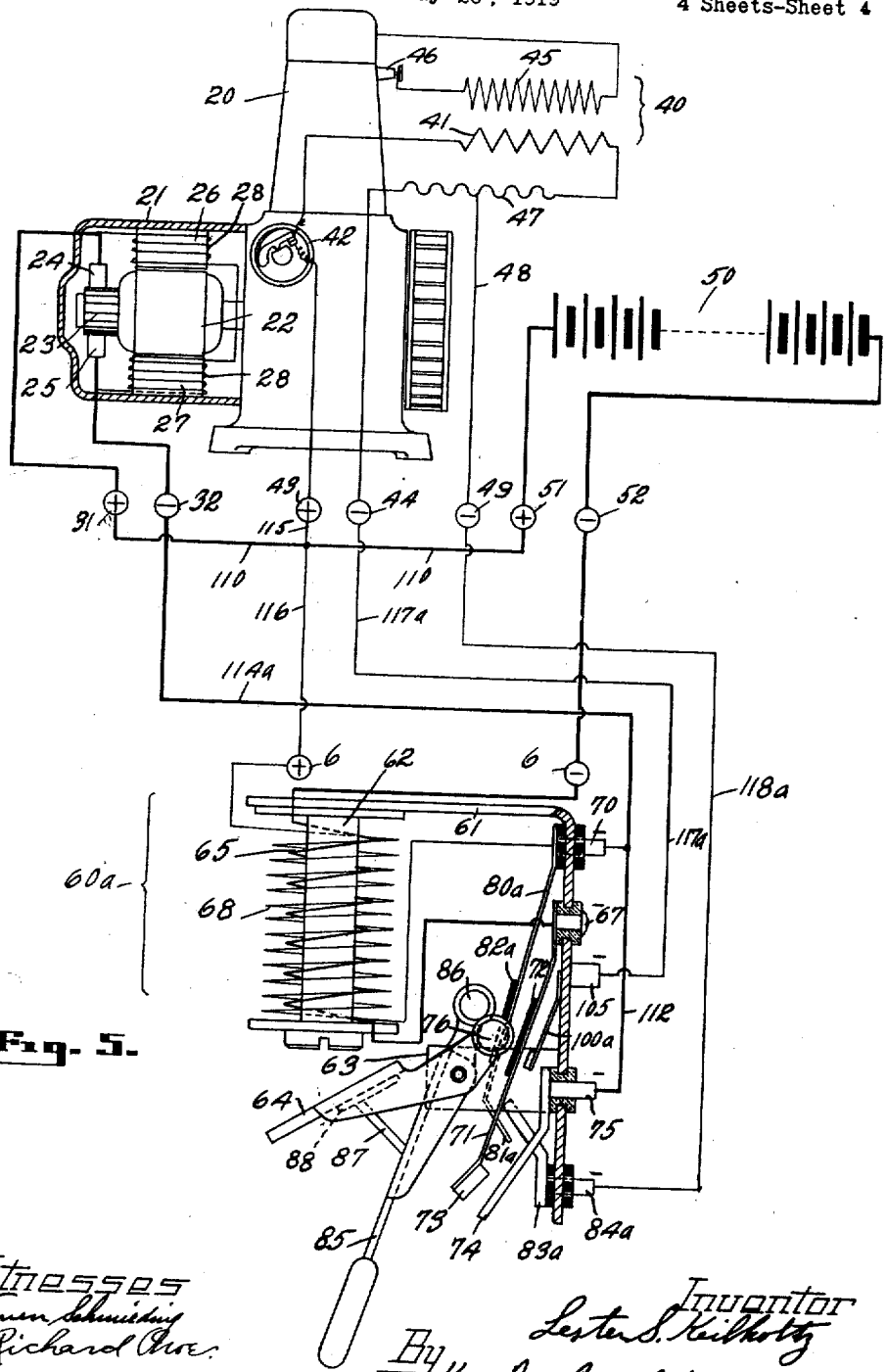
Fig. 5 is a diagrammatic view similar to Fig. 1, showing a modified form of the invention.

In the modified form of the invention shown in Fig. 5, the dynamo is provided with a shunt field 28 only and with terminals 31 and 32. The controller 60ᵃ differs from the controller 60 in that contacts 81ᵃ and 83ᵃ, which are arranged similarly to contacts 81 and 83 of the controller 60, are normally open; the contact 81ᵃ carries an insulated rubbing block 82ᵃ against which the roller 86 bears; and the contact 100ᵃ which is engaged by spring member 71 is grounded on the controller frame 61. In other respects the controller 60ᵃ is like the controller 60. Wire 114ᵃ connects terminal 32 with terminal 70 and bus-bar 112. Wire 117ᵃ connects grounded terminal 105 with terminal 44. Wire 118ᵃ connects contact 83ᵃ and terminal 49.

When the lever 85 is pulled up to start the engine, contacts 81ᵃ and 83ᵃ engage to short-circuit a portion of the ignition resistance, and armature 64 is actuated to cause the engagement of contacts 73 and 74, and the engagement of member 71 with contact 100ᵃ. The dynamo, battery and ignition devices are thereby connected but with a portion of the ignition resistance short-circuited. After the engine becomes self-operative, at a predetermined engine speed the armature 64 will be retained in circuit closing position while lever 85 may be released to open the short-circuit of the ignition resistance.

While the forms of mechanisms herein shown and described constitute preferred embodiments of one form of the invention, it is to be understood that other forms might be adopted and various changes and alterations made in the shape, size, and proportion of the elements therein without departing from the spirit and scope of the invention.

What I claim is as follows:

1. In a controller for an engine starting and battery charging system, including an engine, a storage battery, a dynamo driven by the engine to charge the battery or operable on battery current to crank the engine, and ignition means for the engine including a primary circuit having a resistance, the combination with automatic means for maintaining closed circuits from the battery to the dynamo and ignition means, but permitting said circuits to open when the engine speed falls below a certain value; of manual means operating through said automatic means for initially closing said circuits, said manual means being also adapted to reduce the ignition circuit resistance when moved to close said circuits.

2. In a controller for an engine starting and battery charging system, including an engine, a storage battery, a dynamo driven by the engine to charge the battery or operable on battery current to crank the engine, and ignition means for the engine including a primary circuit having a resistance, the combination with electromagnetic means for maintaining closed circuits from the battery to the dynamo and ignition means, but responsive to battery discharge to dynamo to disconnect said circuits, said means including an armature for closing said circuits; of manual means for moving said armature to circuit closing position and for reducing the ignition primary circuit resistance.

3. In a controller for an engine starting and battery charging system, including an engine, a storage battery, a dynamo driven by the engine to charge the battery or operable on battery current to crank the engine, and ignition means for the engine including a primary circuit having a resistance, the combination with means including a manually movable member for connecting the battery to the dynamo and ignition and for decreasing the normal ignition resistance; automatic means for maintaining connection between the battery and dynamo and ignition unless the engine speed falls below a certain value, while permitting said member to return to inoperative position and to cause the ignition resistance to be increased.

4. In a controller for an engine starting and battery charging system, including an engine, a storage battery, a dynamo driven by the engine to charge the battery or operable on battery current to crank the engine, and ignition means for the engine including a primary circuit having a resistance, the combination with means including a manually movable member for connecting the battery to the dynamo and ignition and for decreasing the normal ignition resistance; automatic means operating independently of the manually movable member for maintaining connections between the battery and dynamo and ignition, whereby said member may return to inoperative position and to cause the ignition resistance to be increased.

5. In a controller for an engine starting and battery charging system, including an engine, a storage battery, a dynamo driven by the engine to charge the battery or operable on battery current to crank the engine, and ignition means for the engine including a primary circuit having a resistance, the combination with means including a manually movable member for connecting the battery to the dynamo and ignition and for decreasing the normal ignition resistance; automatic means operating independently of the manually movable member for maintaining connections between the battery and dynamo and ignition; and a shunt circuit for reducing the ignition circuit resistance and controlled independently of said automatic means by said manually movable member.

6. In a controller for an engine starting and battery charging system, including an engine, a storage battery, a dynamo driven by the engine to charge the battery or operable on battery current to crank the engine, and ignition means for the engine including a primary circuit having a resistance, the combination with a controller frame having an electrical connection grounded thereon; of a shunt circuit for reducing the ignition circuit resistance and including said frame; of means for maintaining closed circuits from the battery to the dynamo and ignition means; of manual means for initially closing said circuit of the dynamo and battery and being grounded on said frame and adapted to close said shunt circuit when moved for initially closing said circuit from the dynamo to the battery.

7. In a controller for an engine starting and battery charging system, including an engine, a storage battery, a dynamo driven by the engine to charge the battery or operable on battery current to crank the engine, and ignition means for the engine including a primary circuit having a resistance, the combination of means including a manually movable member and a pivotal support therefor for connecting the battery to the dynamo and ignition and for decreasing the normal ignition resistance; means for maintaining connections between the battery and dynamo and ignition; and a shunt circuit for reducing the ignition resistance, said manually movable member and pivotal support being included in said shunt circuit.

8. In a controller for an engine starting and battery charging system, including an engine, a storage battery, a dynamo driven by the engine to charge the battery or operable on battery current to crank the engine, and ignition means for the engine including a primary circuit having a resistance, the combination with means including a manually movable member for connecting the battery to the dynamo and ignition, automatic means for maintaining connection between the battery and dynamo and ignition unless the engine speed falls below a certain value, and a shunt circuit for reducing the ignition circuit resistance, said manually movable member being included in said shunt circuit and adapted to interrupt said shunt circuit when returned to its inoperative position.

9. In a controller for an engine starting and battery charging system, including an engine, a storage battery, a dynamo driven by the engine to charge the battery or operable on battery current to crank the engine, and ignition means for the engine including a primary circuit having a resistance, the combination with automatic means for maintaining closed circuits from the battery to the dynamo and ignition means, but permitting said circuits to open when the engine speed falls below a certain value; of manual means operating through said automatic means for initially closing said circuits; and a shunt circuit for reducing the ignition circuit resistance, said manual means being included in said shunt circuit.

10. In a controller for an engine starting and battery charging system, including an engine, a storage battery, a dynamo driven by the engine to charge the battery or operable on battery current to crank the engine, and ignition means for the engine including a primary circuit having a resistance, the combination with automatic means for maintaining closed circuits from the battery to the dynamo and ignition means; of manual means operating through said automatic means for initially closing said circuits, said manual means being also adapted to reduce the ignition circuit resistance when moved to close said circuits.

11. In a controller for an engine starting and battery charging system, including an engine, a storage battery, a dynamo having compound field windings driven by the engine to charge the battery or operable on battery current to crank the engine, and ignition means for the engine including a primary circuit having a resistance, the combination with automatic means for maintaining closed circuits from the battery to the dynamo and ignition means, of manual means operating through said automatic means for initially closing said circuits, said manual means being also adapted to reduce the ignition circuit resistance and to render the series field operative when moved to close said circuits.

In testimony whereof I affix my signature.

LESTER S. KEILHOLTZ.

Witnesses:
J. W. McDONALD,
MILDRED PEARE.